C. A. BODDIE.
ELECTRICAL REGULATOR.
APPLICATION FILED APR. 5, 1916.

1,306,878.

Patented June 17, 1919.
3 SHEETS—SHEET 1.

WITNESSES:
Fred. A. Lind
Otto J. Schainer

INVENTOR
Clarence A. Boddie
BY
Wesley G. Carr
ATTORNEY

C. A. BODDIE.
ELECTRICAL REGULATOR.
APPLICATION FILED APR. 5, 1916.

1,306,878.

Patented June 17, 1919.
3 SHEETS—SHEET 2.

WITNESSES:
Fred A. Lind
Otto S. Schaurer

INVENTOR
Clarence A. Boddie
BY
Wesley G. Carr
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL REGULATOR.

1,306,878.  Specification of Letters Patent.  Patented June 17, 1919.

Application filed April 5, 1916. Serial No. 89,057.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Electrical Regulators, of which the following is a specification.

My invention relates to electrical regulators of the type in which the regulation is effected by rapidly opening and closing a circuit in shunt to a resistor located in the field circuit of an exciter or other dynamo-electric machine, and it has for its object to provide a regulator of this type that shall be more prompt in its response to fluctuations in the quantity regulated and, therefore, more accurate in its performance than other regulators that have been heretofore provided.

Figures 1, 2:
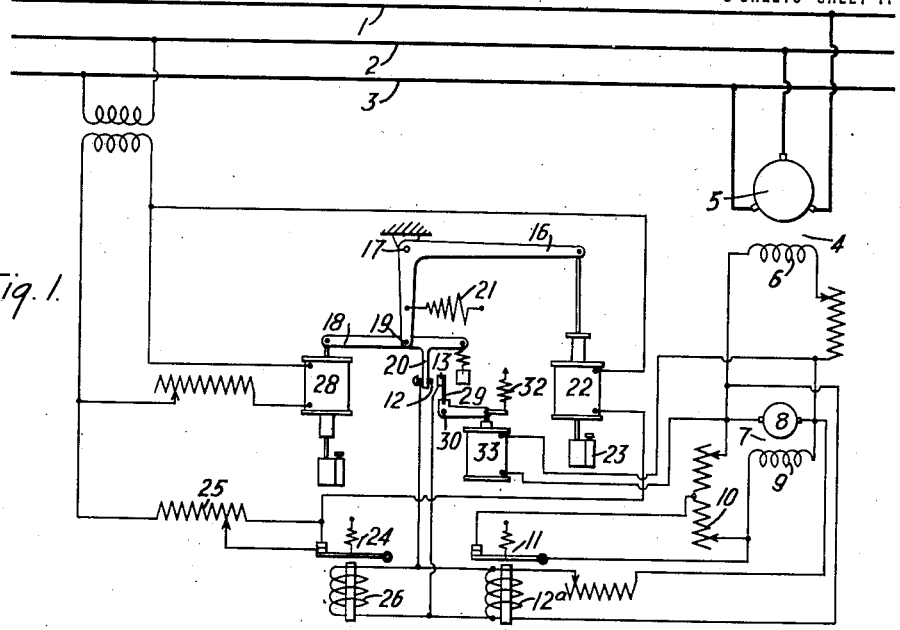

My invention is illustrated in the accompanying drawings, Figure 1 of which diagrammatically illustrates an electrical system comprising a regulator constructed and arranged in accordance therewith, and Figs. 2, 3, 4, and 5, similarly illustrate other systems embodying modifications of the regulator.

An electrical system in connection with which my invention may be conveniently employed comprises a distributing circuit 1—2—3 to which current is supplied by a generator 4 having an armature 5 and a field magnet winding 6 that receives current from an exciter 7 having an armature 8 and a field-magnet winding 9. In series with the field-magnet winding 9 is a resistor 10 the effective value of which is governed by means of a relay 11 that is adapted to rapidly open and close a circuit in shunt to the resistor. The relay 11 is provided with an energizing winding $12^a$ that receives current from any suitable source, such as the exciter 7, and the degree of energization of which is controlled by a pair of coöperating contact members 12 and 13 which, when in engagement, short circuit the said winding.

The contact members 12 and 13 constitute parts of the main control element of a regulator which comprises further a bell-crank lever 16 having a stationary fulcrum at 17 and a second lever 18 that is fulcrumed at 19 upon the lower end of a depending arm of the bell-crank lever 16 and that is provided with an arm 20 upon which the contact member 12 is mounted. The lever 16 is actuated, against the tension of a spring 21 that tends to cause the contact member 12 to engage the member 13, by means of an electromagnet having an energizing winding 22 that receives current proportional to the voltage, or any other suitable electrical quantity which it is desired to regulate, pertaining to the circuit 1—2—3. The movements of the lever 16 are retarded by means of a dash-pot 23. The degree of energization of the winding 22 is governed by means of a relay 24 that is adapted to open and close a circuit in shunt to a suitable portion of a resistor 25 that is included in series with the said winding. The relay 24 is provided with an energizing winding 26 that is connected in parallel with the winding $12^a$, and the current traversing which is likewise controlled by the contact members 12 and 13. The lever 18 is actuated by an electromagnet having an energizing winding 28 that also receives current from the circuit 1—2—3 in proportion to the voltage or other regulated quantity. The contact member 13 is mounted upon one end of a bell-crank lever 29 that is provided with a stationary fulcrum at 30 and is actuated in opposition to the tension of a spring 32 by means of an electromagnet having its armature connected thereto and also having an energizing winding 33 that receives current proportional to the voltage of the exciter 7.

The operation of the regulator may be best described by considering what occurs when, for instance, the voltage of the circuit 1—2—3 is slightly decreased because of an increase of load. Under this condition, the degree of energization of the winding 28 is decreased, with the result that the contact member 12 is moved toward, or into engagement with, the contact member 13. Upon engagement of the said members, the windings $12^a$ and 26 of the relays 11 and 24 are short-circuited, whereupon the resistor 10 in the exciter field circuit is short-circuited, with the result that the exciter field current and voltage are so increased as to cause an increase in the field strength and voltage of the generator 4. At the same time, the relay 24 short circuits a portion of the resistor 25 that is in series with the winding 22 of the regulator which, thereupon, becomes more strongly energized and, accordingly, so actuates the lever 16 against the tension of the spring 21 as to move the terminal 12 away from the terminal 13. When the exciter voltage increases, the electromagnet winding 33 becomes more strongly energized, and it, accordingly, moves the contact terminal 13 away from the terminal 12. It will thus be seen that the electromagnet windings 22 and 33 coöperate to cause separation of the contact terminals. The operation of the regulator is, of course, the reverse of what has been described when the voltage of the circuit 1—2—3 increases.

Since the electromagnet windings 22 and 33 coöperate to produce the same result, the response of the regulator to changes in the voltage of the circuit 1—2—3 is more prompt than is the case when only one of the electromagnets is employed, and the regulator has been found to be very much more effective and accurate in its regulation than regulators heretofore constructed.

Figure 3:
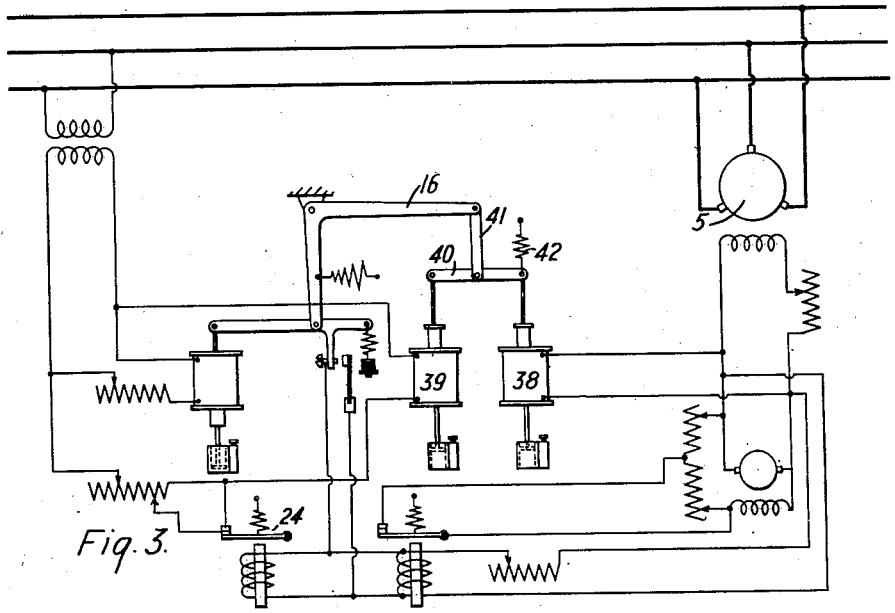
Figure 4:
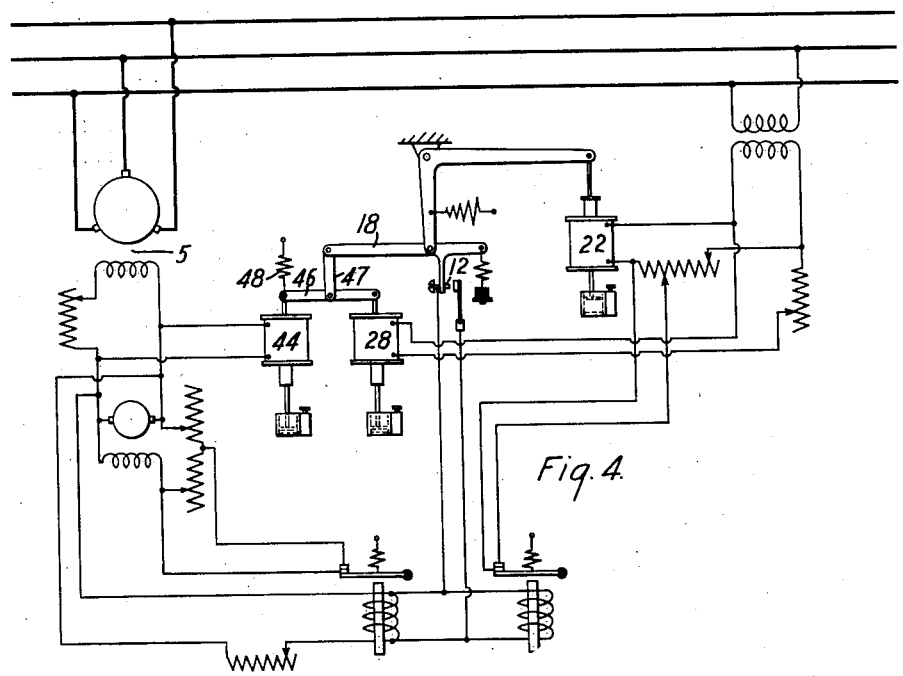

There are many different ways in which the three actuating electromagnets may be combined in a regulator to produce the results that have just been described, and some modifications have been illustrated in Figs. 2, 3, and 4. In the system of Fig. 2, the electromagnet 35 that receives current from the exciter is connected to one end of the spring 36 that opposes the pull of the electromagnet winding 22, and the parts are so arranged that the electromagnet 35 causes a lessening of the tension of the spring 36 at approximately the same time that the electromagnet 22 becomes more strongly energized for the purpose of separating the contact terminals 12 and 13.

In Fig. 3, the electromagnet having its energizing winding 38 connected to the exciter and the electromagnet having a winding 39 the current in which is controlled by the relay 24, have their cores or armatures connected to opposite ends of a lever 40 that is connected, by means of a link 41, to the bell-crank lever 16, the pull of the winding 38 being opposed by a spring 42. The windings 38 and 39 coöperate in the same way as the corresponding windings in the regulators previously described.

In Fig. 4, the electromagnet, the winding 44 of which receives current from the exciter, has its core or armature connected to one end of a lever 46 that is connected, by means of a link 47, to the lever 18 of the regulator, the core of the electromagnet 44 being partially supported by means of a spring 48. The electromagnet winding 28 has its core connected to the other end of the lever 46. The arrangement of the parts is such that the electromagnet winding 44 operates to produce the same movement of the contact member 12 as the electromagnet winding 22.

Figure 5:
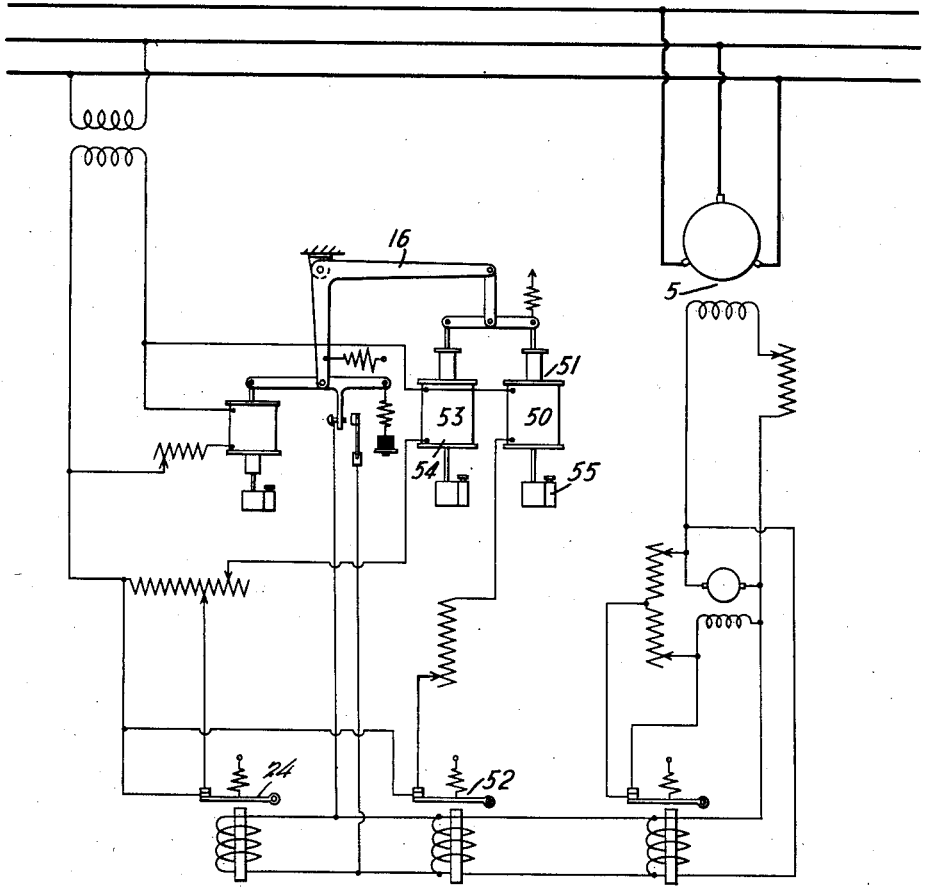

In the system of Fig. 5, the winding 50 of the auxiliary electromagnet is not connected to the exciter, but its energizing current is obtained from the circuit 1—2—3, or from any other suitable source and is applied to the winding intermittently or in impulses by means of a relay 52 that is controlled by the main contact members 12 and 13, in a slightly different manner from the relay 24 that controls the degree of energization of the winding 53 of the electromagnet 54 which vibrates the contact members 12 and 13 into and out of engagement: that is, the magnet winding 50 is alternately energized and deënergized by the action of the relay 52. In other words, the winding 50 receives impulses corresponding in time of occurrence and in duration to the impulses applied to the exciter field and to the impulses in the exciter voltage. The electromagnet 51 is provided with a dash-pot 55 that is adjusted to retard its operation in substantial accordance with the time-constant of the exciter. In other respects the operation of the regulator is similar to that of the regulators of the preceding figures. The modification of Fig. 5 may also be employed in connection with the regulators of the preceding figures.

It will be readily understood that other modifications than those here illustrated and described may be made without departing from the spirit and scope of the invention as set forth in the appended claims.

I claim as my invention:—

1. The combination with an electrical circuit, a dynamo-electric machine associated therewith, and an exciter for the dynamo-electric machine, of a regulator comprising a pair of coöperating contact members, three actuating electromagnets having core members for actuating the contact members, two of the electromagnets receiving current from the circuit, and the third electromagnet receiving current from the exciter, and a plurality of levers for connecting said core members to one of said contact members, each of said core members being independently and pivotally connected to said levers.

2. The combination with an electrical circuit, a dynamo-electric machine associated therewith, and an exciter for the dynamo-electric machine, of a regulator comprising a pair of coöperating contact members, two electromagnets having core members for actuating the contact members, said magnets being energized in proportion to an electrical condition of said circuit and the degree of energization of one of which is further controlled by the contact members independently of the condition of the circuit, a third electromagnet having a core member for actuating the contact members, the third electromagnet being energized in proportion to an electrical condition of the exciter, and a plurality of levers for connecting the core members, each of said core members being independently and pivotally connected to said levers.

3. The combination with an electrical circuit, a dynamo-electric machine associated therewith, and an exciter for the dynamo-electric machine, of a regulator comprising a pair of coöperating contact members, two actuating electromagnets for the contact members, said electromagnets being energized in accordance with the voltage of said circuit and the degree of energization of one of which being further controlled by the contact members independently of the condition of said circuit, and a third actuating electromagnet for the contact members, said third electromagnet being energized in proportion to an electrical condition of the exciter.

4. The combination with an electrical circuit, a dynamo-electric machine associated therewith, and an exciter for the dynamo-electric machine, of a regulator comprising a pair of coöperating contact members, two levers for actuating one of said members one of which is fulcrumed upon the other, an actuating electromagnet for one of said levers receiving current from said circuit, a third lever connected to the other of said levers, and two actuating electromagnets for the third lever one of which receives current from said circuit and the other from the exciter.

5. An electrical regulator comprising a pair of coöperating contact members, two levers for actuating one of said members one of which is fulcrumed upon the other, an actuating electromagnet for one of said levers, a third lever connected to the other of said levers, and two actuating electromagnets for the third lever.

6. The combination with an electrical circuit, a dynamo-electric machine associated therewith, and an exciter for the dynamo-electric machine, of a regulator comprising a pair of coöperating contact members, a train of movably connected operating levers, three magnetizable cores one of which is mechanically associated with a lever at one end of said train and the other two of which are mechanically associated with a lever at the other end of the train, and three actuating electro-magnets for said cores, one of which receives current from said circuit, the circuit of another of which is controlled by the contact members, and the third of which receives impulses of current corresponding to the impulses in the exciter voltage.

7. The combination with an electrical circuit and a dynamo-electric machine, of a regulator for the dynamo-electric machine comprising a pair of coöperating contact members, a train of pivotally connected operating levers, three magnetizable cores one of which is mechanically associated with a lever at one end of said train and the other two of which are mechanically associated with a lever at the other end of the train, and three actuating electromagnets for said cores, one of which receives current from the said circuit, the circuit of another of which is controlled by the contact members, and the third of which receives impulses of current corresponding to the impulses in the excitation voltage of the dynamo-electric machine.

8. The combination with an electrical circuit, a dynamo-electric machine associated therewith, and an exciter for the dynamo-electric machine, of a regulator comprising a pair of coöperating contact members, two actuating electromagnets for the contact members, said electromagnets being energized in accordance with the voltage of the supply circuit, and the degree of energization of one of which is further controlled by the contact members, and a third actuating electromagnet for the contact members, the third electromagnet being energized in accordance with voltage of the exciter circuit.

In testimony whereof, I have hereunto subscribed my name this 29th day of March 1916.

CLARENCE A. BODDIE.